April 20, 1943.  W. V. THELANDER  2,316,820
CLUTCH PLATE
Filed Nov. 25, 1940
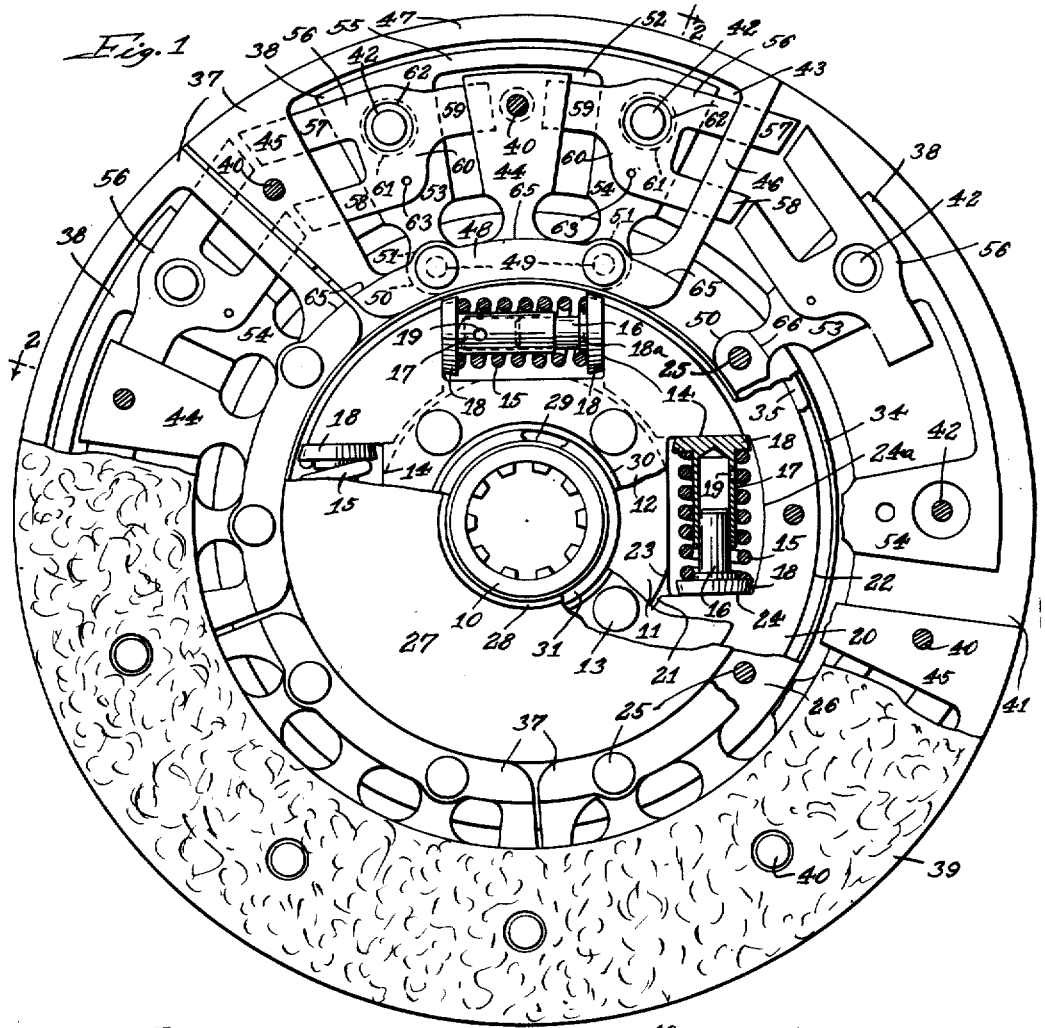
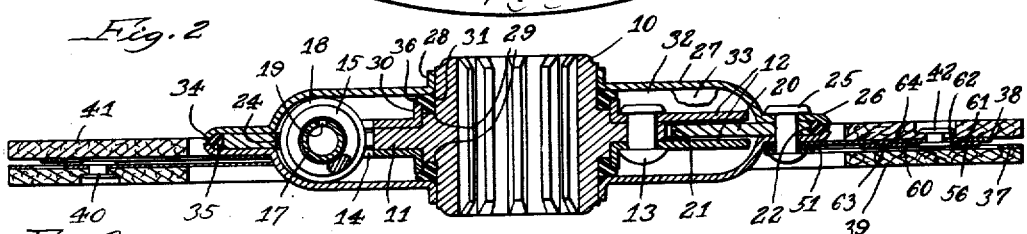
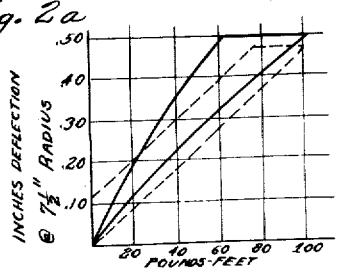
Inventor:
W. Vincent Thelander
By Manna, Wintercorn & Morsbach
Attys.

Patented Apr. 20, 1943

2,316,820

UNITED STATES PATENT OFFICE 2,316,820

CLUTCH PLATE

W. Vincent Thelander, Rockford, Ill.

Application November 25, 1940, Serial No. 366,960

17 Claims. (Cl. 64—27)

This invention relates to motion transmitting elements and is more particularly concerned with improvements in automotive type friction clutch plates. This application is a continuation in part of my copending application Serial No. 316,088, filed January 29, 1940.

The principal object of my invention is to provide a motion transmitting element such as a clutch plate having spring means between the relatively oscillatory inner and outer elements and incorporating fluid damping means in the hub to eliminate the tendency for the springs and other portions of the hub structure to sound off under certain conditions in the operation of the device.

A salient feature of the invention lies in the provision as part of the fluid damping means of an interfitting piston and cylinder in conjunction with each of a plurality of coiled compression springs forming the spring cushioning means, the piston and cylinder serving not only to form a fluid pumping device using the fluid damping medium as its working fluid to give increased cushioning action in one direction and in the other direction check the recoil of the springs so as to smoothen the drive, but also serving as a spring retainer so as to prevent rubbing contact between the spring and adjacent portions of the plate. The piston and cylinder have enlarged head ends larger in diameter than the outside diameter of the spring so that the ends of the spring, which in other clutch plates were found to be subject to wear on the first and second coils, are held positively out of engagement with the adjacent portions of the plate. The construction furthermore is applicable with very little change to clutches for different makes of cars, because a change in the size of the bleeder hole in the cylinder wall is all that is usually necessary to adapt the plate to the difference in operating characteristics of another engine in another make of car.

Another important object of the invention consists in the provision of a fluid filled motion transmitting element of the kind mentioned embodying simple but effective means for positively sealing the fluid filled hub against leakage, although the housing of said hub is necessarily of two-piece sheet metal construction and must necessarily be free to oscillate to a limited extent relative to the center hub.

The invention is illustrated in the accompanying drawing, in which—

Fig. 1 is a rear view of a clutch plate made in accordance with my invention showing approximately half of the hub housing plate broken away so as to better illustrate the hub construction and also showing approximately half of the friction facing removed to better illustrate the rest of the plate construction;

Fig. 2 is a section taken on the broken line 2—2 of Fig. 1, and

Fig. 2a is a graphic illustration of the functioning of the shock absorber means employed in the plate of Fig. 1.

The same reference numerals are applied to corresponding parts throughout the views.

Referring to the drawing, the clutch plate shown comprises relatively rotatable inner and outer portions, the inner portion being formed by a center hub 10 splined for driving connection with the driving shaft of an automotive transmission and provided with an annular flange 11 onto opposite sides of which two circular sheet metal plates 12 are riveted, as indicated at 13. These plates have a plurality of equally circumferentially spaced openings 14 provided therein, four in the present instance, one for each of a plurality of spring cushioning means 15, the openings in the two plates being in register with one another. Assembled in each opening 14 with the spring 15 is a piston 16 and cylinder 17 extending into the spring from opposite ends and provided with enlarged circular head ends 18 larger in diameter than the spring so as to space the ends of the spring from adjacent portions of the plate and avoid wear on the end coils. Each piston 16 has an annular shoulder 18a thereon at its outer end next to the head 18 of approximately the same outside diameter as the cylinder 17 so that both ends of the spring 15 are centered alike with relation to the heads 18. The cylinder 17 has a bleeder hole 19 provided in the wall thereof to which further reference will be made later. A ring 20, the inner and outer peripheries 21 and 22 of which are in concentric relation with the periphery 23 of the flange 11, has notches 24 cut therein in register with the openings 14 and is disposed between the plates 12, as clearly appears in Fig. 2, for engagement of the ends of notched portions 24 with the spring cushioning means, the drive being taken at one end of the notched portions 24 and by the respectively opposite ends of the openings 14 in a manner well understood in this art. The radially outer side 24a of each of the notches 24 in the ring 20 are struck on arcs concentric with the inner and outer peripheries 21 and 22, as clearly appears in Fig. 1, and the head ends 18 of the pistons 16 and cylinders 17 are tapered, as indicated, to conform to these arcs 24a. The ring 20 is riveted at circumferentially spaced points, as indicated at 25, between the peripheral flanges 26 of two sheet metal housing plates 27. The latter have central circular openings defined by circular flanges 28 which have close fitting bearing engagement on the opposite ends of the hub 10 in spaced relation to the annular shoulders 29. The circular plates 12 fastened on the opposite sides of the flange 11 have circular central openings defined by outwardly bent flanges 30 fitting over the peripheries of the shoulders 29 and projecting from these shoulders toward the plates 27 to retain compressible resilient gaskets 31 which serve to seal the annular oil or grease chamber 32 in the hub housing against leakage of the heavy lubricating oil or grease with which the chamber 32 is filled, as indicated at 33 in Fig. 2. The flanges 26 project radially beyond outer periphery 22 of the ring 20 and have inwardly bent peripheral edge portions 34 between which another gasket 35 of compressible resilient material is retained in compressed condition to seal the outer periphery of the chamber 32 against leakage of the oil or grease 33. These gaskets 31 and 35 are preferably of an oil resistant rubber, such as neoprene. The gaskets 31 are compressed axially in the riveting of the housing plates 27, as indicated by the bulge 36, and in the slight rotary movement of the housing plates with respect to the hub this relative movement is easily accommodated by torsional distortion within the gaskets 31 themselves, so that there will be no likelihood of having to replace these gaskets due to wear. In passing, attention is called to the fact that the clutch disk proper, formed by the two sets of sheet metal stampings 37 and 38 are riveted with the housing plates 27 to the ring 20 by the rivets 25. The stampings 37 carry the annular facing ring 39 on rivets 40, and the stampings 38 carry the companion facing ring 41 on rivets 42.

In operation, when relative movement takes place between the inner and outer portions of the clutch plate, the springs 15 are compressed to cushion the drive. At the same time, the heavy oil or grease 33 with which the cylinders 17 are filled is discharged to some extent through the bleeder holes 19 so that these pumping devices add materially to the cushioning effect, accordingly relieving the springs 15 of some of the load. The heavy oil or grease 33 is indicated only to the extent shown in Fig. 2, to avoid confusion. The recoil action of the springs 15 is also checked by the pistons and cylinders 16—17 because their return to normal extended relationship is retarded as a result of the restriction of the bleeder holes 19 through which the heavy oil or grease 33 must flow. In that way, the secondary vibrations are absorbed and a smooth drive is obtained. The hysteresis curve of Fig. 2a in the form of a triangle illustrates graphically the operation of the shock absorber means 16—17. Special attention is called to the fact that there is negligible reaction at the low end and extreme reaction at the upper end. The dotted curve illustrates the radically different performance obtained with frictional braking means used heretofore to resist the return of the parts to normal relationship after compression of the springs 15. The friction braking means have been generally unsatisfactory because of the fact that the friction surfaces relied upon are subject to wear and there is usually no way of compensating for it, or, if adjusting means are provided, it is not easy or convenient to operate the same. As a result, no uniform braking action is obtainable and in most cases there is no appreciable braking action obtained after the clutch plate has been in service for a time, long enough for the friction surfaces to wear down to a certain extent. On the other hand, with the present construction the heavy grease or oil 33 affords the desired checking action without perceptible wear on the relatively movable parts 16 and 17, inasmuch as the oil or grease serves to lubricate these parts. A very important function of the oil or grease 33 is its dampening or sound deadening action. The oil or grease serves to absorb the primary vibrations substantially entirely, and, working with the pistons and cylinders 16 and 17, serves to substantially completely dampen secondary vibrations. In other constructions where all conceivable precautions are taken to obtain quiet operation including the interposition of non-metallic members to avoid metal-to-metal contact, the springs used for cushioning are frequently found to sound off due to vibration, but with the present construction even that eventuality is avoided because the springs 15 are immersed in the heavy oil or grease 33, and, of course, it goes without saying that this heavy oil or grease has the same sound deadening effect upon all of the other parts with which it is in contact, the result being that the present clutch plate operates more quietly than all other constructions with which I am familiar. The bleeder holes 19 may be reduced or increased in size in the application of clutch plates of the present invention to different makes and sizes of cars to give substantially as good performance with one as with another and usually without any other change in the construction, excepting, of course, a change in diameter of plates. The pistons 16 and cylinders 17, as previously stated, serve to retain the springs 15 in the desired operative relationship to the relatively movable parts of the plate and keep the same in spaced relation to the adjacent parts so that there is no danger of the end coils being worn by rubbing contact with such adjacent parts.

The sheet metal stampings 37 and 38, forming the subject matter of a divisional application Serial No. 400,310, filed June 28, 1941, are of the segmental form clearly illustrated in Fig. 1, five of each of these stampings being used to complete the outer portion of the plate on which the facings 39 and 41 are carried, although, of course, it is obvious that the number of sections employed may be reduced or increased. Each stamping 37 has a generally U-shaped opening 43 punched therein defining a middle radial finger 44 and opposed radial fingers 45 and 46 interconnected by an arcuate outer peripheral web 47. The finger 44 extends outwardly from an inner arcuate peripheral web 48 interconnecting the inner ends of the fingers 45 and 46 and there are two circumferentially spaced holes 49 in the web 48 registering with similar holes in the inner arcuate peripheral web portion 50 of the companion stamping 38 through which openings the rivets 25 extend to fasten the stampings to the ring 20 along with the housing plates 27, washers 51 being preferably interposed between the stampings 37 and 38, one at each rivet, so as to space the stampings 37 and 38 for a purpose which will soon appear. Each stamping 38 has an opening 52 punched therein at the middle thereof whereby to define two radial fingers 53 and 54 interconnected at their inner ends by the aforesaid arcuate web 50 and interconnected at their outer ends by another arcuate web 55. Each pair of stampings 37 and 38 when placed in assembled relationship has the middle finger 44 of the stamping 37 disposed radially in the middle of the opening 52 in the stamping 38, and the two fingers 53 and 54 of the stamping 38 are disposed radially in the middle of the opposite end portions of the U-shaped opening 43, while the web 55 of the stamping 38 is disposed radially between the outer end of the finger 44 and the web 47 of the stamping 37. Now, bearing in mind the fact that the washers 51, which, by the way, are all of the same thickness, serve to space the stampings 37 and 38 in parallel planes, it will be clear that there is room between the stampings for flat leaf-springs 56 of approximately the same thickness as the washers 51, or less, so long as the leaf-springs are disposed, as shown in Figs. 1 and 2, in a parallel intermediate plane. Each of the leaf-springs 56 is generally H-shaped so as to provide two substantially parallel fingers 57 and 58 on one side and a single finger 59 on the other side of the transverse intermediate attaching portion 60. The springs 56 are mounted on the fingers 53 and 54 of the stampings 38 by means of their attaching portions 60 and are disposed in reversed relation to one another in overlapping relation to the middle finger 44 of the stamping 37, whereas the two sets of fingers 57 and 58 extend away from one another, the one pair being in overlapping relation to the finger 45 and the other pair being in overlapping relation to the finger 46 of the stamping 37 and preferably also extending beyond the finger 46 to overlapping relation with a portion of the finger 45 of the next stamping 37. The forking of the leaf-springs 56 so as to provide the fingers 57 and 58 is for the purpose of clearance with reference to the heads of the alternate rivets 40 which come between the ends of the fingers 57 and 58, as clearly appears in Fig. 1, the other fingers 59 being disposed with their ends on opposite sides of the heads of the intermediate rivets 40, as also clearly appears in Fig. 1. The rivets 42 for fastening the facing ring 41 to the stampings 38 are used also to fasten the leaf-springs 56 to the stampings 38, the fingers 53 and 54 being provided with enlarged holes 61 to receive hollow struck-out or embossed circular portions 62 on the attaching portions 60 of the leaf-springs 66, in the hollows of which the heads of the rivets 42 are received so as to lie flush with the outer faces of the leaf-springs 56, as clearly appears in Fig. 2. The purpose of this is to avoid any interference with the facing ring 39 "packing" tightly against the adjacent face of the leaf-spring 56 in the engagement of the clutch. For a similar reason the heads of the rivets 40 are made as thin or thinner than the leaf-springs 56 so that they will not interfere with the "packing" of the facing ring 41 tightly against the other face of the leaf springs 56 (see Fig. 3). Each leaf-spring 56 has a small struck-out hollow circular boss 63 on the attaching portion 60 in radially spaced relation to the boss 62 and arranged to engage in a hole 64 provided therefor in the stamping 38, each of the fingers 53 and 54 being provided with these holes and half of the leaf-springs 56 having their bosses 62 and 63 struck in one direction and the other half having their bosses 62 and 63 struck in the opposite direction to permit assembling the same in reversed relationship to one another, those of one type alternating with those of the other type.

The engagement of the bosses 63 in the hole 64 locks the leaf-springs 56 against turning about the rivets 42 as centers. In operation, it should be clear that as the pressure plate is moved toward the flywheel in the engagement of the clutch the facings 39 and 41 are pressed together, flexing the fingers 57, 58 and 59 of all of the leaf-springs 56 so that the spring pressure of the leaf-springs 56 tending to keep the facings 39 and 41 apart insures the desired smooth engagement of the clutch and avoids grabbing. The leaf-springs 56 being normally flat will of course exert increasing spring pressure on the facings 39 and 41 as they approach fully engaged relationship, the outer portion of the clutch plate being tightly packed between the pressure plate and flywheel when the clutch is fully engaged. In full engagement of the clutch, the facing ring 39 is pressed tightly against the adjacent face of the leaf-springs 56 and the facing ring 41 is pressed tightly against the other face of the leaf-springs 56. Such tight packing is possible only because of the fact that the fingers 44, 45 and 46 on the stampings 37 can be flexed into the same plane with the fingers 53 and 54 of the stampings 38. When the clutch is disengaged, the leaf-springs 56 return to the flat unflexed form and accordingly return the fingers of the stampings 37 and 38 to their normal spaced parallel relationship. The fact that all of the leaf-springs 56 are flat, as distinguished from specially formed spring metal parts previously provided for motion purposes, makes for a clutch plate of uniform increased thickness in the disengaged condition and therefore obviates the objection common in many other clutch plate constructions of non-uniform engagement and accordingly non-uniform and rapid wear of the clutch plate facings and a tendency for the clutch to grab. In other words, flat leaf-springs like those shown at 56 can be produced to the desired uniformity, whereas specially shaped parts cannot be produced to a desired uniformity without difficulty, which means close rigorous inspection and a high percentage of rejections in quantity production of clutch plates. The fact that the fingers 57 and 58 of every alternate leaf-spring 56 cooperates not only with the finger 46 of one stamping 37 but to a certain extent also with the finger 45 of the next stamping 37 further insures accurate coplanar alignment of all of the stampings 37 in one plane and coplanar alignment of all of the stampings 38 in a parallel plane. The fact that the present motion construction requires spring steel only in the leaf-springs 56 is of course an important factor from the economy standpoint. In passing, attention is called to the fact that the fingers 44, 45 and 46 on the stampings 37 are bent between dies on the lines 65 normal to their radii and next to the point of attachment of the stampings to the ring 20 and housing plates 27 slightly in the direction of the stamping 38, and the fingers 53 and 54 of the stampings 38 are bent between dies in the opposite direction toward the stamping 37 on corresponding lines 66 normal to their radii and next to the point of attachment of the stamping 38 to the ring 20 and housing plates 27, whereby when the stampings 37 and 38 are riveted at 25 with the leaf-springs 56 assembled in place therebetween, the fingers 57, 58 and 59 of the leaf-springs are solidly engaged with the stampings 37 but the stampings 37 are in accurate parallelism with the stampings 38. In other words, the bending along the lines 65 and 66 is so slight that the pressure of the fingers on the stampings 37 and 38 on the fingers of the leaf-springs 56 is not sufficient to flex the latter but is only enough to insure uniform thickness of plates throughout their circumference, in quantity production.

It is believed the foregoing description conveys a good understanding of the objects and advantages of my invention. The appended claims have been drawn with a view to covering all legitimate modifications and adaptations.

I claim:

1. A motion transmitting element comprising relatively oscillatable inner and outer members, a coiled compression spring for resisting relative rotary movement between the inner and outer members, an interfitting piston and cylinder associated with said spring and normally held in extended relation to one another by the spring, the cylinder extending axially into the spring from one end and the piston extending axially into the spring from the other end, the piston and cylinder each having an enlarged substantially circular head portion on the outer end thereof for abutment on the inner side thereof with the adjacent ends of the spring, respectively, the head portions being of larger diameter than the spring whereby to space the end coils of the spring radially with respect to adjacent portions of the motion transmitting element while retaining said spring against displacement from operative position and transmitting pressure to the spring to compress the same in the relative rotary movement between the inner and outer members, and a housing turning with the outer member relative to the inner member and having a portion in closely spaced relation to the peripheries of said head portions, said housing serving to retain the piston and cylinder in operative relation to the inner member.

2. A motion transmitting element as set forth in claim 1, wherein the piston has an annular shoulder provided thereon at the outer end thereof next to the head portion and of approximately the same diameter as the outside diameter of the cylinder and entered in and serving to center the adjacent end of the coiled compression spring with respect to the head portion of the piston.

3. A motion transmitting element comprising relatively oscillatable inner and outer members, the inner member comprising a hub having an annular flange, and circular plates secured to the opposite sides of said flange having registering openings provided therein in circumferentially spaced relation in the outer peripheral portion thereof, the outer member comprising a ring member in concentric relation with and surrounding said flange between the circular plates and having openings provided therein in register with the aforesaid openings, and two circular housing plates having bearing engagement centrally on the hub and secured peripherally to the opposite sides of said ring member, coiled compression springs in said openings arranged to resist relative rotary movement between the hub and outer member, said springs being enclosed by said housing plates and retained thereby against displacement from said openings, the housing defined between the housing plates containing a liquid damping medium, and sealing means for said housing to prevent leakage of said liquid damping medium comprising gasket rings surrounding the hub and compressed between the flange and the housing plates, and means for retaining said gasket rings comprising annular flanges on the circular plates annularly enclosing the gasket rings.

4. A motion transmitting element comprising relatively oscillatable inner and outer members, the inner member comprising a hub having an annular flange, and circular plates secured to the opposite sides of said flange having registering openings provided therein in circumferentially spaced relation in the outer peripheral portion thereof, the outer member comprising a ring member in concentric relation with and surrounding said flange between the circular plates and having openings provided therein in register with the aforesaid openings, and two circular housing plates having bearing engagement centrally on the hub and secured peripherally to the opposite sides of said ring member, coiled compression springs in said openings arranged to resist relative rotary movement between the hub and outer member, said springs being enclosed by said housing plates and retained thereby against displacement from said openings, the housing defined between the housing plates containing a liquid damping medium, and sealing means for said housing to prevent leakage of said liquid damping medium comprising a gasket ring surrounding the outer periphery of the ring member and compressed between the outer peripheral portions of said housing plates, and means for retaining said gasket ring comprising an annular flange on the outer periphery of at least one of said housing plates projecting inwardly and enclosing the gasket ring.

5. A motion transmitting element comprising relatively oscillatable inner and outer members, the inner member comprising a hub having an annular flange and annular shoulders on opposite sides of said flange in concentric relation with the hub and flange, and circular plates secured to the opposite sides of said flange having registering openings provided therein in circumferentially spaced relation in the outer peripheral portion thereof, the outer member comprising a ring member in concentric relation with and surrounding said flange between the circular plates and having openings provided therein in register with the aforesaid openings, and two circular housing plates having bearing engagement centrally on the hub and secured peripherally to the opposite sides of said ring member, coiled compression springs in said openings arranged to resist relative rotary movement between the hub and outer member, said springs being enclosed by said housing plates and retained thereby against displacement from said openings, the housing defined between the housing plates containing a liquid damping medium, and sealing means for said housing to prevent leakage of said liquid damping medium comprising gasket rings surrounding the hub and compressed between the annular shoulders on the hub and the housing plates, and means for retaining said gasket rings comprising annular flanges on the circular plates annularly enclosing the annular shoulders and projecting outwardly therefrom to annularly enclose said gasket rings.

6. In a clutch plate comprising relatively oscillatable inner and outer members, the inner member comprising a center hub, the outer member comprising a housing surrounding the hub, and an outer plate portion rigid with the housing and adapted to have limited rotary movement therewith relative to the hub, said outer plate portion carrying friction facing material for friction drive of the plate, the combination of spring means acting between the hub and housing to resist the relative rotary movement therebetween, and an interfitting relatively reciprocable piston and cylinder constituting a fluid checking means cooperating with the spring means to resist relative movement in one direction and retard return movement.

7. In a clutch plate comprising relatively oscillatable inner and outer members, the inner member comprising a center hub, the outer member comprising a housing surrounding the hub, and an outer plate portion rigid with the housing and adapted to have limited rotary movement therewith relative to the hub, said outer plate portion carrying friction facing material for friction drive of the plate, the combination of spring means in said housing for resisting relative rotary movement between the hub and housing, a liquid damping medium with which said housing is substantially filled surrounding the spring means to absorb the sound incident to vibration thereof, and an interfitting relatively reciprocable piston and cylinder constituting a fluid checking means cooperating with the spring means and utilizing the liquid damping medum as its working fluid to resist relative movement in one directon and retard return movement by the discharge and intake of said liquid out of and into said cylinder.

8. A motion transmitting element comprising relatively oscillatable inner and outer members, one or more coiled compression springs for resisting relative rotary movement between the inner and outer members, and an interfitting piston and cylinder associated with each of said springs and normally held in extended relation to one another by the spring, said piston and cylinder being movable relative to one another in the relative rotary movement between the inner and outer members to compress the associated spring, said piston and cylinder being constructed to have restricted discharge of fluid therefrom in the compression movement and to have restricted intake of fluid in the expansion movement of said spring, whereby to add to the cushioning effect of the spring in compression and retard the recoil action of the spring following compression, while retaining the spring in operative relationship to the inner and outer members.

9. A motion transmitting element as set forth in claim 8, wherein the outer member comprises a housing surrounding a portion of the inner member along with said springs and associated pistons and cylinders, the element including a liquid damping medium substantially completely filling the housing and constituting the working fluid for said pistons and cylinders.

10. A motion transmitting element comprising relatively oscillatable inner and outer members, one or more coiled compression springs for resisting relative rotary movement between the inner and outer members, and an interfitting piston and cylinder associated with each of said springs and normally held in extended relation to one another by the spring, the cylinder extending axially into the spring from one end and the piston extending axially into the spring from the other end, the piston and cylinder each having an enlarged annular bearing on the outer end thereof for abutment on the inner side with the adjacent ends of the spring, respectively, and said bearings having abutment on their outer sides with the adjacent portions of the inner and outer members, respectively, said piston and cylinder being movable relative to one another in the relative rotary movement between the inner and outer members to compress the associated spring, said piston and cylinder being constructed to have restricted discharge of fluid therefrom in the compression movement and to have restricted intake of fluid in the expansion movement of said spring, whereby to add to the cushioning effect of the spring in compression and retard the recoil action of the spring following compression, while retaining the spring in operative relationship to the inner and outer members.

11. A motion transmitting element as set forth in claim 8, wherein one of the piston and cylinder elements associated with each of said springs has an opening provided in the wall thereof of a predetermined restricted size, whereby accordingly to predetermine the cushioning effect of the piston and cylinder and the recoil checking action thereof.

12. A motion transmitting element as set forth in claim 10, wherein one of the piston and cylinder elements associated with each of said springs has an opening provided in the wall thereof of a predetermined restricted size, whereby accordingly to predetermine the cushioning effect of the piston and cylinder and the recoil checking action thereof.

13. In a clutch plate comprising relatively oscillatable inner and outer members, the inner member comprising a center hub, the outer member comprising a housing surrounding the hub, and an outer plate portion rigid with the housing and adapted to have limited rotary movement therewith relative to the hub, said outer plate portion carrying friction facing material for friction drive of the plate, the combination of a plurality of coiled compression springs in circumferentially spaced relation relative to said members acting between the hub and housing for resisting relative rotary movement therebetween, and shock absorber means individual to each of said springs for checking the recoil action thereof.

14. A motion transmitting element comprising relatively oscillatable inner and outer members, the inner member comprising a hub having an annular flange, and circular plates secured to the opposite sides of said flange having registering openings provided therein in circumferentially spaced relation in the outer peripheral portion thereof, the outer member comprising a ring member in concentric relation with and surrounding said flange between the circular plates and having openings provided therein in register with the aforesaid openings, and two circular housing plates having bearing engagement centrally on the hub and secured peripherally to the opposite sides of said ring member, coiled compression springs in said openings arranged to resist relative rotary movement between the hub and outer member, said springs being enclosed by said housing plates and retained thereby against displacement from said openings, and an interfitting piston and cylinder associated with at least one of said springs and normally held in extended relation to one another by the spring, the cylinder extending axially into the spring from one end and the piston extending axially into the spring from the other end, the piston and cylinder each having an enlarged substantially circular head portion on the outer end thereof for abutment on the inner side thereof with the adjacent ends of the spring, respectively, the head portions being of larger diameter than the spring whereuy to space the end coils of the spring radially with respect to the adjacent housing plates.

15. A motion transmitting element as set forth in claim 14, wherein the piston has an annular shoulder provided thereon at the outer end thereof next to the head portion and of approximately the same diameter as the outside diameter of the cylinder and entered in and serving to center the adjacent end of the coiled compression spring with respect to the head portion of the piston.

16. A motion transmitting element comprising relatively oscillatable inner and outer members, the inner member comprising a hub having an annular flange, and circular plates secured to the opposite sides of said flange having registering openings provided therein in circumferentially spaced relation in the outer peripheral portion thereof, the outer member comprising a ring member in concentric relation with and surrounding said flange between the circular plates and having openings provided therein in register with the aforesaid openings, and two circular housing plates having bearing engagement centrally on the hub and secured peripherally to the opposite sides of said ring member, coiled compression springs in said openings arranged to resist relative rotary movement between the hub and outer member, said springs being enclosed by said housing plates and retained thereby against displacement from said openings, the housing defined between the housing plates containing a liquid damping medium, and sealing means for said housing to prevent leakage of said liquid damping medium comprising a gasket ring surrounding the outer periphery of the ring member and compressed between the outer peripheral portions of said housing plates.

17. In a clutch plate comprising relatively oscillatable inner and outer members, the inner member comprising a center hub, the outer member comprising a housing surrounding the hub, and an outer plate portion rigid with the housing and adapted to have limited rotary movement therewith relative to the hub, said outer plate portion carrying friction facing material for friction drive of the plate, the combination of a plurality of coiled compression springs in circumferentially spaced relation relative to said members acting between the hub and housing for resisting relative rotary movement therebetween, a liquid damping medium with which said housing is substantially filled surrounding the spring means to absorb the sound incident to vibration thereof, and fluid checking means individual to each of said springs for checking the recoil action thereof utilizing said liquid for its working fluid, said fluid checking means relieving the spring means of a portion of the load in the relative rotary movement.

W. VINCENT THELANDER.